(12) United States Patent
Funahashi et al.

(10) Patent No.: US 7,704,638 B2
(45) Date of Patent: Apr. 27, 2010

(54) BATTERY AND BATTERY MODULE

(75) Inventors: Atsuhiro Funahashi, Moriguchi (JP);
Masayuki Fujiwara, Moriguchi (JP);
Hitoshi Maeda, Moriguchi (JP);
Yoshitaka Shinyashiki, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 12/155,092

(22) Filed: May 29, 2008

(65) Prior Publication Data

US 2008/0299451 A1    Dec. 4, 2008

(30) Foreign Application Priority Data

May 30, 2007    (JP)    ............... 2007-143845

(51) Int. Cl.
*H01M 6/42*    (2006.01)
*H01M 2/02*    (2006.01)
*H01M 2/04*    (2006.01)
*H01M 2/08*    (2006.01)

(52) U.S. Cl. ............... 429/185; 429/149; 429/163; 429/175

(58) Field of Classification Search ............... 429/149, 429/175, 176, 178, 163, 181, 185, 211
See application file for complete search history.

(56) References Cited

U.S. PATENT DOCUMENTS

2003/0165736 A1* 9/2003 Hiratsuka ............... 429/153
2006/0046139 A1* 3/2006 Suzuki et al. ............... 429/175
2006/0275658 A1* 12/2006 Sanada et al. ............... 429/185

FOREIGN PATENT DOCUMENTS

| JP | 01035851 A | * | 2/1989 |
| JP | 10-106513 A | | 4/1998 |
| JP | 2002-56829 A | | 2/2002 |

OTHER PUBLICATIONS

JP 01-035851, Takasu et al., Feb. 1989, see English translation.*

* cited by examiner

*Primary Examiner*—Jonathan Crepeau
*Assistant Examiner*—Kenneth Douyette
(74) *Attorney, Agent, or Firm*—Kubovcik & Kubovcik

(57) ABSTRACT

A power-generating element containing a stacked electrode assembly (10) and an electrolyte solution is disposed in an accommodating space of a plastic battery case (13). The entirety of the battery case (13) is enclosed air-tightly and liquid-tightly in an outer cover made of an aluminum laminate. An opening (13A) of the battery case (13) is sealed by sealing members (16a, 16b) disposed and melt-bonded so as to cover an opening (13A) of the battery case 13 and to sandwich current collectors (14, 15) of the power-generating element from both sides. The outer cover is sealed at at least a location corresponding to the opening (13A) of the battery case (13).

12 Claims, 11 Drawing Sheets

BATTERY AND BATTERY MODULE

BACKGROUND OF THE INVENTION

1. Field of the Invention

The present invention relates to batteries such as prismatic lithium-ion batteries used for low-rate discharge backup power sources, and battery modules in which a plurality of such batteries are connected to each other. More particularly, the invention relates to batteries and battery modules that use a lightweight and rigid battery case made of plastic and that achieve high reliability and low cost.

2. Description of Related Art

Power sources used for low-rate discharge backup applications, for example, are hermetically sealed in a limited space and are therefore desired to be compact and lightweight, as well as being low in cost. As one type of batteries that can meet such requirements, lithium-ion batteries, which have high energy density and high power density, have been used widely in recent years. Lithium-ion batteries have been used as secondary batteries for various types of mobile devices.

For the lithium-ion batteries, a battery case made of an aluminum laminate sheet or a metallic can, such as an aluminum can and a stainless steel can, have been used as the outer package. A problem with the use of a metallic can is that although it has rigidity against impact from the outside, metal has greater specific gravity than plastic or the like, resulting in a lower mass energy density of the battery. On the other hand, a battery case made of an aluminum laminate sheet can make the battery lightweight. However, it tends to show insufficient strength to resist impact from the outside because the aluminum laminate sheet is soft, and in order to supplement the insufficient strength, it has been necessary to provide additional means such as covering the battery with an outer cover such as a housing having rigidity.

In addition, when lithium-ion batteries employing a battery case made of a metallic can or an aluminum laminate are used to construct a battery module, it has been necessary to use a housing and battery module components that are made of metal or plastic to construct the battery module using the batteries, and the corresponding increase in the parts count has been a problem.

For lead acid batteries, plastic battery cases have been used because they are low in cost. However, the use of plastic battery cases for lithium-ion batteries is particularly problematic because plastic does not provide complete hermeticity. Specifically, since the lithium-ion battery uses an electrolyte solution containing an organic solvent, entry of moisture through the wall of the plastic battery case and leakage of gas generated from the organic solvent of the electrolyte solution through the wall can be significant causes of poor durability of the battery.

In view of this problem, for example, the following techniques have been known in the field of lead acid batteries. Japanese Published Unexamined Patent Application No. 2002-56829 discloses a battery in which a cylindrical metallic container is fitted outside a plastic battery case. Japanese Published Unexamined Patent Application No. 10-106513 discloses a battery structure in which a metal plate is integrally formed in a plastic battery case. These techniques can prevent deformation and fracture of the plastic battery case, thereby improving the strength. Moreover, it is also possible to minimize permeation and evaporation of moisture.

Nevertheless, the techniques as disclosed in Japanese Published Unexamined Patent Application Nos. 2002-56829 and 10-106513 are far from satisfactory in terms of weight reduction and cost reduction because no particular improvements are observed in terms of parts count reduction.

BRIEF SUMMARY OF THE INVENTION

Accordingly, it is an object of the present invention to provide a battery and a battery module that have sufficient hermeticity and high reliability, while being lightweight and rigid, and moreover achieve lower parts count and low cost.

In order to accomplish the foregoing and other objects, the present invention provides a battery, comprising:

a battery case made of plastic and having an accommodating space;

a power-generating element disposed in the accommodating space of the battery case, the power-generating element comprising a positive electrode, a negative electrode, and an electrolyte;

current collectors respectively connected to the positive electrode and the negative electrode of the power-generating element, the current collectors disposed spaced apart and extending outward from an opening portion of the battery case;

an outer cover air-tightly and liquid-tightly enclosing an entirety of the battery case in which the power-generating element is disposed, the outer cover having one or more layers including a metal layer; and sealing members disposed and melt-bonded so as to cover the opening portion of the battery case and sandwich the current collectors from both sides, whereby the opening portion of the battery case is sealed; and wherein the sealing members are melt-bonded to the peripheral edge of the opening portion of the battery case and to the current collectors more firmly than the sealing members are melt-bonded to each other, and the outer cover is sealed at at least a location corresponding to the opening portion of the battery case.

With the configuration of the battery according to the present invention, necessary rigidity is ensured and moreover sufficient hermeticity is achieved without substantially impairing the lightness in weight of the plastic battery case. Moreover, when the internal pressure of the battery rises to a certain level, the sealing portion at which the sealing members are melt-bonded to each other is split open and the gas is released outside. In other words, the sealed portion of the sealing members with each other function as a safety valve and serves as a gas release passage that can guide the gas in the battery to the outside. Thus, by making use of the sealed portion at the opening portion of the battery case, a gas release mechanism in the event of internal pressure increase is formed without additionally providing a safety valve. Accordingly, the parts count of the battery is reduced, and thereby the battery becomes lighter in weight and lower in cost.

Thus, the present invention makes it possible to provide a battery and a battery module that have sufficient hermeticity and high reliability, while being lightweight and rigid, and moreover achieve lower parts count and low cost.

DETAILED DESCRIPTION OF THE INVENTION

Figure 1:
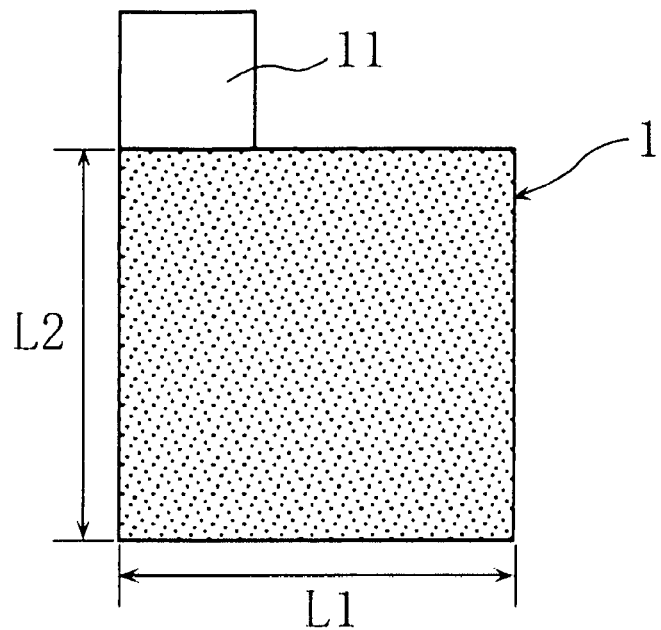
FIG. 1 is a front view illustrating a positive electrode used for a battery of the present invention.

According to the present invention, a battery comprises: a battery case made of plastic and having an accommodating space; a power-generating element disposed in the accommodating space of the battery case, the power-generating element comprising a positive electrode, a negative electrode, and an electrolyte; current collectors respectively connected to the positive electrode and the negative electrode of the power-generating element, the current collectors disposed spaced apart and extending outward from an opening portion of the battery case; an outer cover air-tightly and liquid-tightly enclosing an entirety of the battery case in which the power-generating element is disposed, the outer cover having one or more layers including a metal layer; and sealing members disposed and melt-bonded so as to cover the opening portion of the battery case and sandwich the current collectors from both sides, whereby the opening portion of the battery case is sealed; and wherein the sealing members are melt-bonded to the peripheral edge of the opening portion of the battery case and to the current collectors more firmly than the sealing members are melt-bonded to each other, and the outer cover is sealed at at least a location corresponding to the opening portion of the battery case.

In the above-described configuration, the plastic battery case which is made, for example, of polyethylene, polypropylene, polyethylene terephthalate, and the like, is enclosed air-tightly and liquid-tightly in the outer cover having one or more layers including a metal layer. Therefore, required rigidity is ensured, and moreover, sufficient hermeticity is achieved without substantially impairing the lightness in weight of the plastic battery case. In addition, the sealing members are disposed and melt-bonded so as to cover the opening portion of the battery case and to sandwich the current collectors of the power-generating element disposed in the accommodating space of the battery case from both sides, whereby the opening portion of the battery case is sealed. Therefore, when the internal pressure of the battery rises to a certain level, a sealing portion at which the sealing members are melt-bonded to each other is split open and the gas is released to the outside. The sealing members are melt-bonded also to the current collectors and the peripheral edge of the opening portion of the battery case. However, the sealing members are more firmly melt-bonded to each other to these components than to the sealing members themselves. Accordingly, when the internal pressure of the battery rises, only the sealed portion at which the sealing members 16a and 16b are melt-bonded splits open, causing the gas to be released while the portions at which the sealing members are melt-bonded to the current collectors and the peripheral edge of the opening portion of the battery case do not split open but remain sealed. Thus, the sealed portion where the sealing members are bonded to each other functions as a safety valve, and serves as a gas release passage that can guide the gas generated in the battery to the outside. In other words, without additionally providing a safety valve, a gas release mechanism in the event of an internal pressure increase is constructed by making use of sealed portions at the opening portions of the battery case. Accordingly, the parts count of the battery is reduced, and thereby the battery is made lighter in weight and lower in cost.

The sealing members may be part of the outer cover.

The outer cover may be made of a sufficiently flexible material, for example, a laminate of polypropylene, aluminum and polyethylene terephthalate or the like having a thickness of about 100 µm. It may be disposed so as to cover the opening portion of the battery case and also to sandwich the current collectors from both sides, and the peripheral edge of the opening portion of the battery case and the current collectors may be melt-bonded and sealed to each other and also the portions of the outer cover that are between the current collectors may be melt-bonded and sealed to each other. In this way, the outer cover itself is allowed to function equally to the sealing members. Thereby, the parts count is further reduced, accordingly the battery construction is simplified, and the cost is further reduced.

It is desirable that a securing member having rigidity is disposed and secured so as to cover the opening portion of the battery case and sandwich the current collectors from both sides.

The opening portion of the battery case is a portion from which the current collectors of the power-generating element extend outward, and it does not have a sufficient strength to withstand impact from the outside. By providing the securing member having rigidity as described above, sufficient strength is ensured in that portion and a structure that can withstand impact from the outside is achieved.

In this case, although it is possible to dispose a sealing member that will be described later on the inside of the securing member, the securing member may be sealed by melt-bonding the peripheral edge of the opening portion of the battery case directly with the current collectors. In other words, the securing member may be allowed to also function as the sealing member. Thereby, the parts count is reduced correspondingly. When this is the case, a gap corresponding to the thickness of the current collector forms in the portion of the securing member between the current collectors. It is recommended that this gap be sealed by filling therein a filling material that achieves hermeticity so that, in the event that the internal pressure increases, the sealing at this portion of the securing member can be split open earlier than the sealing of the securing member with the peripheral edge of the opening portion of the battery case and the current collectors.

It is desirable that the securing members be made of a rigid plastic.

Any type of material may be used as the material for the securing member as long as the material has sufficient rigidity. However, the use of plastic allows the securing member to be made light in weight while ensuring the required rigidity and also makes it possible to lower the cost of the securing member.

It is desirable that the sealing members be separate components from the outer cover and be made of a film material, for example, polypropylene, formed in a strip shape, the film material having one or more layers including a metal layer.

The above-described configuration allows the sealing members to have a shape that corresponds to the shape of the region that requires sealing in the opening portion of the battery case. Thus, that region can be sealed more reliably and easily, and reliability and workability can be improved correspondingly.

It is desirable that the battery be a lithium-ion battery.

The present invention is applicable to, for example, nickel-metal hydride batteries and nickel-cadmium batteries. However, as described above, the entry of moisture through the wall of the plastic battery case and leakage of the gas generated from the organic solvent of the electrolyte solution through the wall is especially problematic in the case of lithium-ion batteries. Therefore, the advantageous effect of the present invention, in which sufficient hermeticity of the plastic battery case is achieved without substantially impairing the lightness in weight of the plastic battery case, is particularly significant in the case of lithium-ion batteries. Furthermore, in addition to the use of the plastic battery case, the weight reduction resulting from the reduction of the parts count, such as due to the elimination of a safety valve, makes it possible to construct the battery without degrading the high mass energy density of the lithium-ion battery, which is a significant advantageous feature thereof.

The present invention also provides a battery module, comprising: a battery case made of plastic and having a plurality of accommodating spaces; a plurality of power-generating elements disposed in the accommodating spaces of the battery case, each one of the power-generating elements comprising a positive electrode, a negative electrode, and an electrolyte and disposed in a respective one of the plurality of accommodating spaces; current collectors respectively connected to the positive electrode and the negative electrode of each of the power-generating elements, the current collectors disposed spaced apart from each other and extending outward from a plurality of opening portions formed in the battery case; an outer cover air-tightly and liquid-tightly enclosing an entirety of the battery case in which the power-generating elements are disposed, the outer cover having one or more layers including a metal layer; and sealing members disposed and melt-bonded so as to cover the opening portions of the battery case and sandwich the current collectors of the power generating elements from both sides, whereby the opening portions of the battery case are sealed; and wherein the sealing members are melt-bonded to respective peripheral edges of the opening portions of the battery case and to the respective current collectors of the power generating elements more firmly than the sealing members are melt-bonded to each other; the current collectors of the power-generating elements are connected to each other either in series or in parallel and are connected to a positive electrode current collector terminal or a negative electrode current collector terminal, the positive and negative electrode current collector terminals extending outward from the outer cover; and the outer cover is completely sealed. The positive and negative electrode current collector terminals extend to the outside of the sealed portions.

In the above-described configuration, the plastic battery case is enclosed air-tightly and liquid-tightly in the outer cover having one or more layers containing a metal layer, as in the case of the above-described battery. As a result, required rigidity is ensured, and moreover, sufficient hermeticity is achieved without substantially impairing the lightness in weight of the plastic battery case. In addition, the sealing members are disposed and melt-bonded so as to cover the opening portions of the battery case and to sandwich the current collectors of each of the power-generating elements disposed in the accommodating spaces of the battery case from both sides, whereby the opening portions of the battery case are sealed. As a result, the sealing portion at which the sealing members are melt-bonded to each other functions as a safety valve, and serves as a gas release passage through which the gas inside the batteries can be released to the outside. In other words, without additionally providing a safety valve, a gas release mechanism in the event of internal pressure increase is constructed by making use of the sealed portions at the opening portions of the battery case. Accordingly, the parts count of the battery module is reduced, and thereby the battery module is made lighter in weight and lower in cost.

Moreover, the outer cover is sealed at the portions from which the positive electrode current collector terminal and the negative electrode current collector terminal extend outside the outer cover. Thereby, a portion of a gas release passage can be formed making use of the portion from which the positive electrode current collector terminal or the negative electrode current collector terminal extends outward so that the sealing of the outer cover can be broken at this portion to release the gas to the outside. Thus, a gas release passage that can smoothly release the gas can be formed at this portion with a simple and efficient configuration.

Furthermore, a plurality of accommodating spaces is formed in the plastic battery case, and one of the power-generating elements each comprising a positive electrode, a negative electrode, and an electrolyte is disposed in a respective one of the accommodating spaces. Thus, the battery module is configured without separately preparing housings made of metal or plastic or components for the battery module. As a result, the parts count of the battery module is further reduced, and the battery module is further made lighter in weight and lower in cost.

It is desirable that a securing member having rigidity is disposed and secured so as to cover the opening portions of the battery case.

By employing the above-described structure, sufficient strength is ensured at the portions in the opening portions of the battery case from which the current collectors of each of the power generating elements extend outward, and a structure that can withstand impact from the outside is achieved, as in the case of the above-described battery.

It is desirable that the securing member have a shape such as to cover an entirety of the current collectors connected in series or in parallel and comprise a cut-out portion allowing the positive electrode current collector terminal or the negative electrode current collector terminal to pass therethrough.

Although the securing member may be disposed and secured so as to cover the opening portions of the battery case and to sandwich the current collectors of each of the power-generating elements from both sides, as in the case of the foregoing battery, the securing member can be disposed more easily and reliably when it has such a shape as to cover the entirety of the current collectors connected in series or in parallel and comprises a cut-out portion allowing the positive electrode current collector terminal or negative electrode current collector terminal to pass therethrough. More specifically, since the entirety of the current collectors can be covered by one securing member, the securing member can be configured more easily and moreover the work of positioning and securing the securing member can be conducted more easily and reliably than in the case in which each one of the opening portions of the battery case is provided with one corresponding securing member.

In addition, by positioning and securing the securing member so that the portion other than the cut-out portion is hermetically sealed, the gas can be guided to this cut-out portion, in other words, to the portion from which the positive electrode current collector terminal or the negative electrode current collector terminal extends outward, more smoothly and reliably.

It is desirable that the securing members be made of plastic.

As in the case of the foregoing battery, any type of material may be used as the material for the securing member as long as the material has sufficient rigidity. However, the use of plastic allows the securing member to be made light in weight while ensuring the required rigidity and also makes it possible to lower the cost of the securing member.

It is desirable that the sealing members be made of a film material formed in a strip shape, the film material having one or more layers including a metal layer.

As in the case of the foregoing battery, the above-described configuration allows the sealing members to have a shape that corresponds to the shape of the region that requires sealing in each of the opening portions of the battery case. Thus, the region can be sealed more reliably and easily, and reliability and workability can be improved correspondingly.

It is desirable that the battery module comprise a lithium-ion battery as a battery.

The batteries comprised in the battery module may be, for example, nickel-metal hydride batteries, nickel-cadmium batteries, or the like, as in the case of the foregoing battery. However, as described above, the entry of moisture through the wall of the plastic battery case and leakage of gas generated from the organic solvent of the electrolyte solution through the wall is especially problematic in the case of lithium-ion batteries. Therefore, the advantageous effect of the present invention, in which sufficient hermeticity of the plastic battery case is achieved without substantially impairing the lightness in weight of the plastic battery case, is particularly significant in the case of lithium-ion batteries. Furthermore, in addition to the use of the plastic battery case, the weight reduction resulting from the reduction of the parts count, such as due to elimination of a safety valve and particularly elimination of housings for assembling the battery module and components for the battery module, makes it possible to construct the battery module without degrading the high mass energy density of the lithium-ion batteries, which is a significant advantageous feature thereof.

EMBODIMENTS

Hereinbelow, with reference to the drawings, the present invention is described in further detail based on certain embodiments and examples thereof. It should be construed, however, that the present invention is not limited to the following embodiments and examples, but various changes and modifications are possible without departing from the scope of the invention.

Preparation of Positive Electrode 90 mass % of $LiCoO_2$ as a positive electrode active material, 5 mass % of carbon black as a conductive agent, and 5 mass % of polyvinylidene fluoride as a binder agent were mixed with a N-methyl-2-pyrrolidone (NMP) solution as a solvent to prepare a positive electrode mixture slurry. Thereafter, the resultant positive electrode mixture slurry was applied onto both sides of an aluminum foil (thickness: 15 µm) serving as a positive electrode current collector, except for the region to which a positive electrode current collector tab would be welded. Then, the material was dried to remove the solvent, pressure-rolled by rollers to a predetermined thickness (0.1 mm), and as illustrated in FIG. 1, cut into a shape that has a predetermined width and height (width $L1$=95 mm, height $L2$=95 mm) and from which a positive electrode current collector tab 11 (a portion on which the positive electrode slurry was not applied) protrudes, to complete a positive electrode 1. The area on which the positive electrode slurry was applied had dimensions of 95 mm in width and 94 mm in height.

Figure 2:
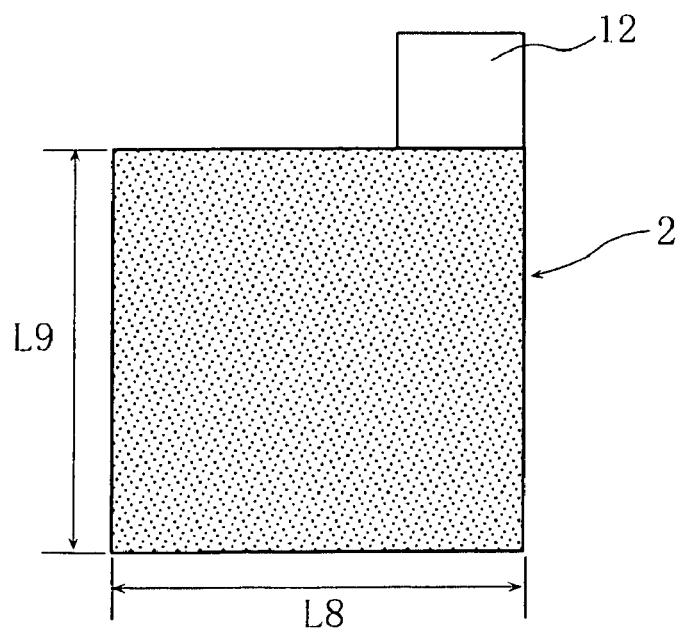
FIG. 2 is a front view illustrating a negative electrode used for a battery of the present invention.

Preparation of Negative Electrode 95 mass % of graphite powder as a negative electrode active material and 5 mass % of polyvinylidene fluoride as a binder agent were mixed with a NMP solution as a solvent to prepare a negative electrode mixture slurry. Thereafter, the resultant slurry was applied onto both sides of a copper foil (thickness: 10 µm) serving as a negative electrode current collector, except for the region to which a negative electrode current collector tab would be welded. Then, the material was dried to remove the solvent, pressure-rolled by rollers to a predetermined thickness, and as illustrated in FIG. 2, cut into a shape that has a predetermined width and height (width $L8$=100 mm, height $L9$=100 mm, $L1<L8$, $L2<L9$) and from which a negative electrode current collector tab 12 (a portion on which the slurry was not applied) protrudes, to complete a negative electrode 2.

Preparation of Positive Electrode Enclosed in Separator

Figure 3:
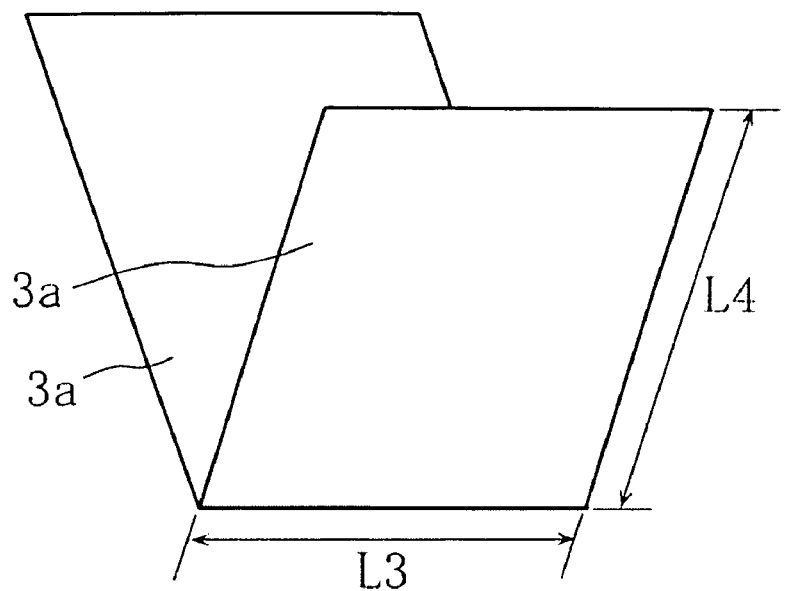
FIG. 3 is a perspective view illustrating a separator used for a battery of the present invention.
Figure 4:
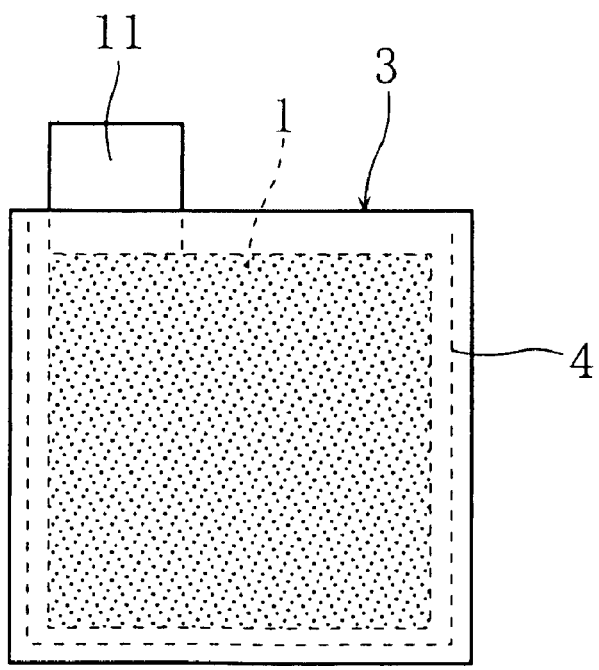
FIG. 4 is a front view illustrating a positive electrode, in which the positive electrode shown in FIG. 1 is enclosed in the separator shown in FIG. 3.

As illustrated in FIG. 3, two sheets of separators 3a made of polypropylene (PP), each of which was cut into the dimensions equal to those of the negative electrode 2 (width $L3=L8$=100 mm, height $L4=L9$=100 mm), were prepared. The positive electrode 1 was sandwiched by the separators 3a, and the perimeter portions of the separators 3 were thermally welded at a welded part 4, as illustrated in FIG. 4, so that the separators were formed into a bag.

Preparation of Stacked Electrode Assembly

Figure 5:
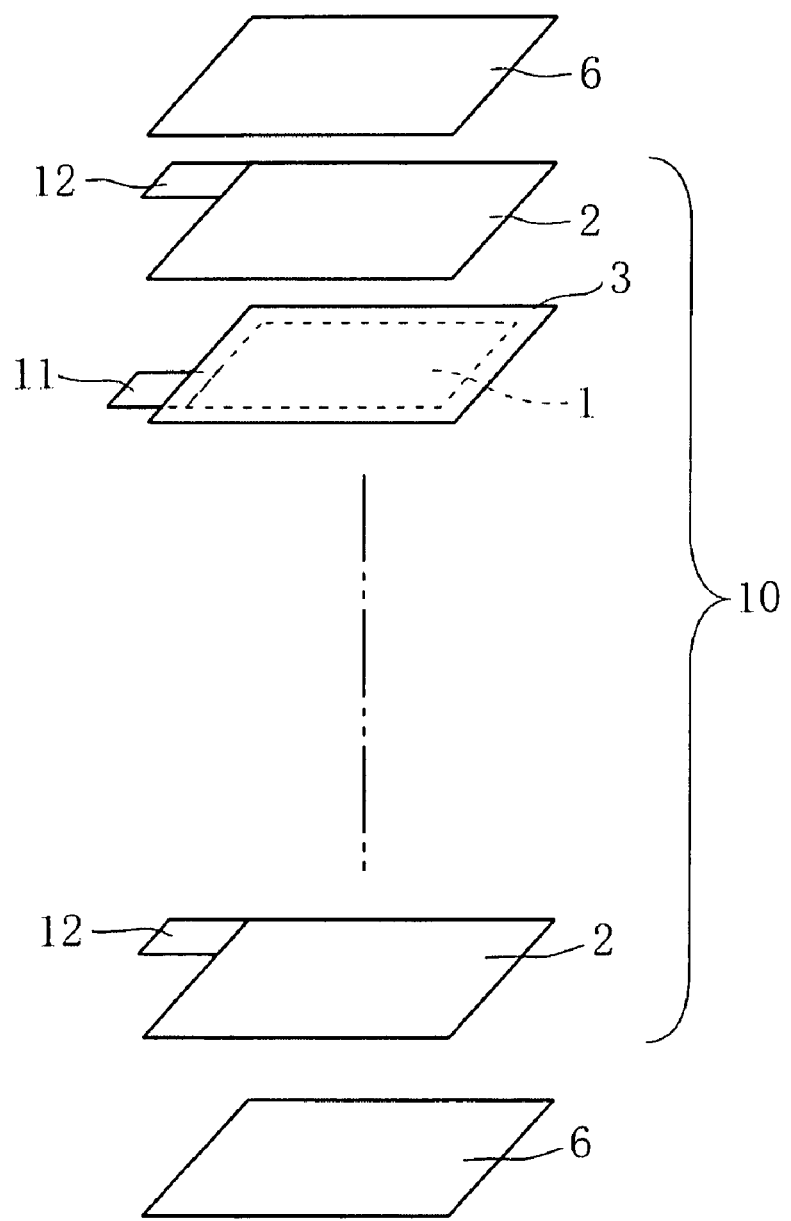
FIG. 5 is an exploded perspective view illustrating a stacked electrode assembly used for a battery of the present invention.
Figure 6:
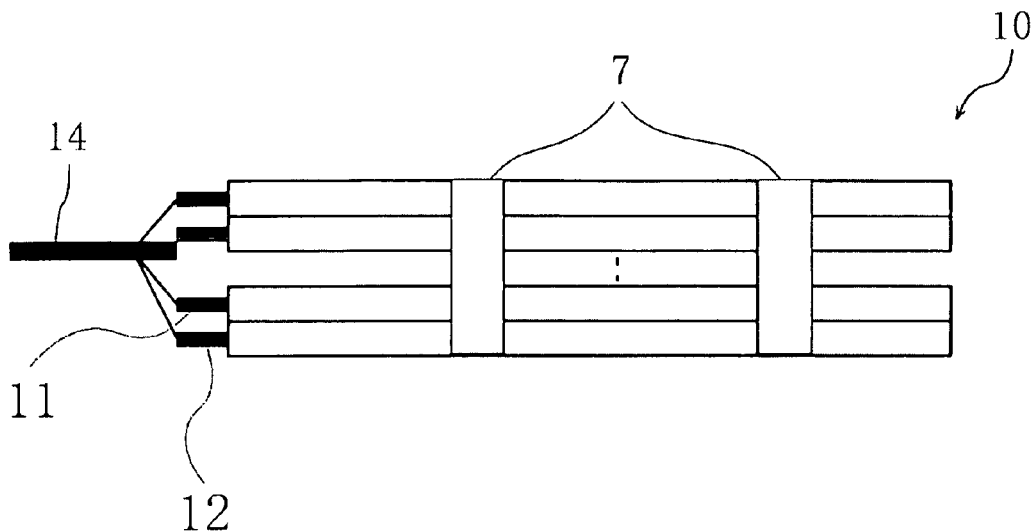
FIG. 6 is a side view illustrating a stacked electrode assembly used for the battery of the present invention.

As illustrated in FIG. 5, 10 sheets of the positive electrodes 1, each of which was enclosed in a bag made of a separator as described above, and 11 sheets of the negative electrodes 2 were prepared and laminated so that both end faces of the laminate were negative electrodes 2. End face sheets 6 made of polypropylene were disposed in order to retain the shape, and as illustrated in FIG. 6, both end face sheets 6 were connected to each other by an insulating tape 7, to thus prepare a stacked electrode assembly 10. The thickness of the stacked electrode assembly 10 was 2.2 mm. Next, positive electrode current collector tabs 11 and negative electrode current collector tabs 12 were welded to a current collector lead 14 and a current collector lead 15, respectively, by ultrasonic welding. It should be noted that in the figure, reference numeral 14 denotes the positive electrode current collector lead to which the positive electrode current collector tabs 11 are connected, and that the negative electrode current collector lead to which the negative electrode current collector tabs 12 are connected is not shown in FIG. 6 but is indicated by reference numeral 15 in FIG. 8.

Preparation of Plastic Battery Case for Battery

Figure 7:
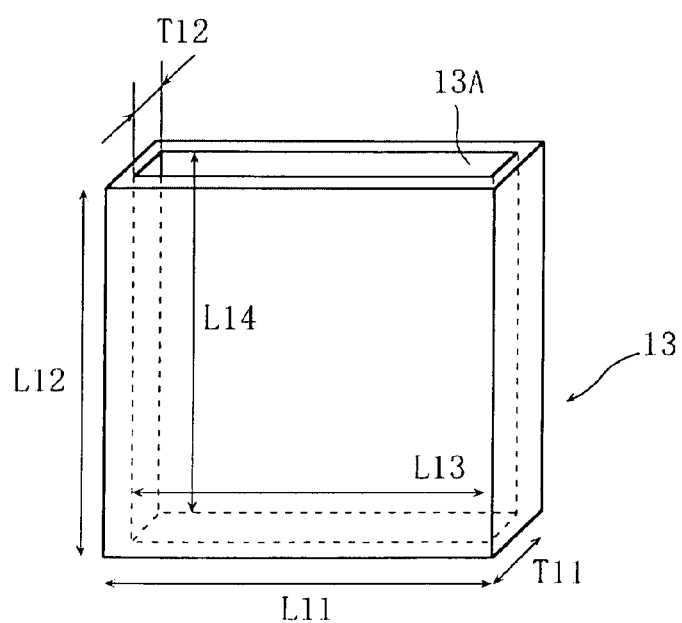
FIG. 7 is a perspective view illustrating a battery case used for a battery of the present invention.

As illustrated in FIG. 7, a battery case 13 made of polypropylene was prepared. The battery case 13 had an accommodating space with a width L13=102 mm, a depth L14=105 mm, and a thickness T12=2.4 mm, and had an opening 13A formed at the top. The battery case 13 had a width L11=106 mm, a height L12=107 mm, and a thickness T11=6.4 mm.

Preparation of Battery

Figure 8:
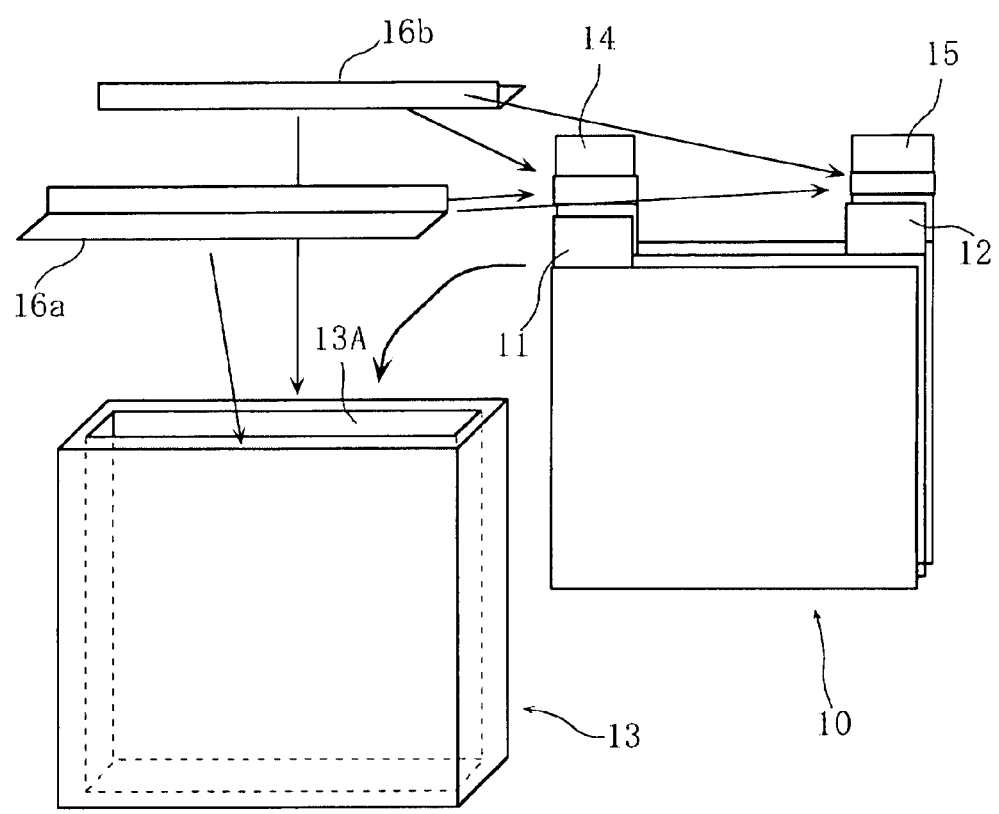
FIG. 8 is a perspective view illustrating a disassembled state of a battery case, a stacked electrode assembly, and sealing members that constitute a battery of the present invention.
Figure 9:
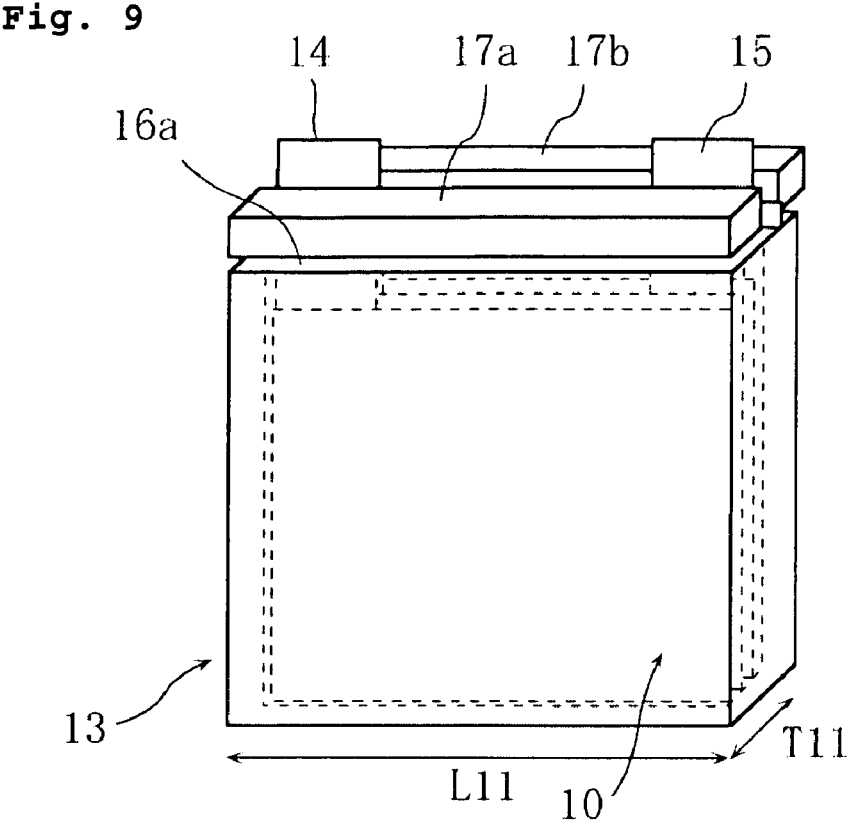
FIG. 9 is a perspective view illustrating a state of a battery of the present invention, from which the outer cover is removed.
Figure 10:
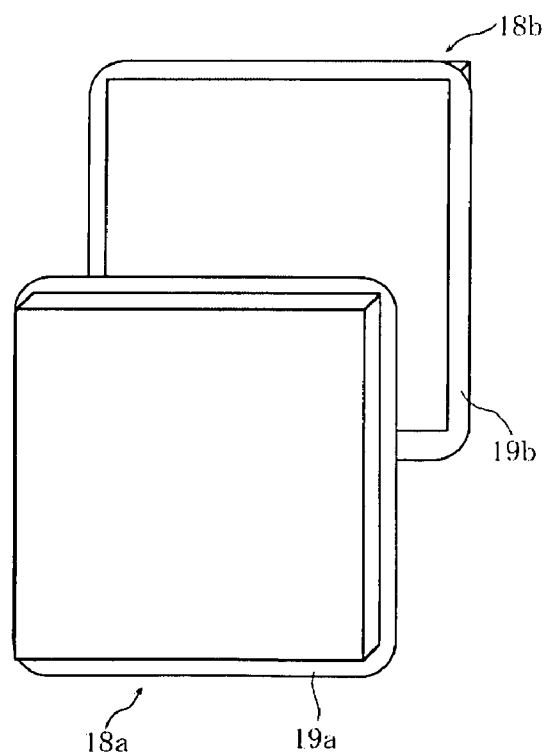
FIG. 10 is a perspective view illustrating an outer cover used for a battery of the present invention.
Figure 11:
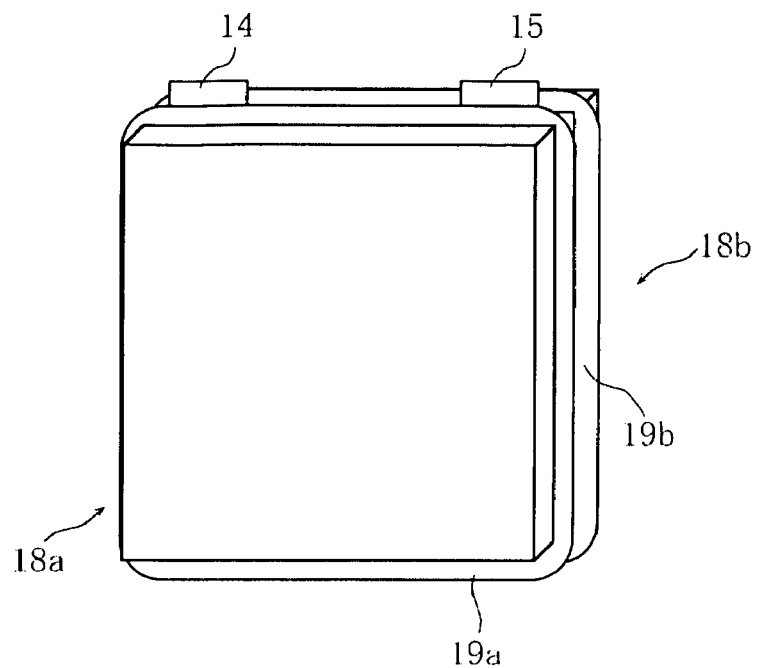
FIG. 11 is a perspective view illustrating a battery of the present invention.

As illustrated in FIG. 8, the stacked electrode assembly 10 was inserted through the opening 13A and disposed in the accommodating space within the battery case 13. Next, two strip-shaped aluminum laminate sheets having a length of 106 mm and a width of 6.4 mm were prepared to form sealing members 16a and 16b. The sealing members 16a and 16b were bent perpendicularly along the longitudinal direction at the center of the width so that they have a hook-shaped cross section. One of the portions of each of the sealing members 16a and 16b was held upright, with the vertically upright portions of the sealing members 16a and 16b facing each other with the other portions thereof extending outward in opposite directions. In this condition, these sealing members 16a and 16b were disposed along the upper edge of the battery case 13. Using an adhesive that can effect melt-bonding by heat, both the sealing members 16a and 16b were thermally melt-bonded to the upper edge of the battery case 13, and the portions of the sealing members 16a and 16b that are located between the two current collectors were thermally melt-bonded and sealed so as sandwich the two current collectors of the stacked electrode assembly 10, namely, the positive electrode current collector tabs 11/positive electrode current collector lead 14 and the negative electrode current collector tabs 12/negative electrode current collector lead 15, from both sides. In this step, the positive electrode current collector tabs 11/positive electrode current collector lead 14 and the negative electrode current collector tabs 12/negative electrode current collector lead 15 were not melt-bonded to the sealing members 16a and 16b. Thereafter, under a special atmosphere, an electrolyte solution in which LiPF$_6$ was dissolved at a concentration of 1 M (mole/liter) in a mixed solvent of 30:70 volume ratio of ethylene carbonate (EC) and methyl ethyl carbonate (MEC) was filled into the accommodating space of the battery case 13 through the gap between the two sealing members 16a, 16b and the positive electrode current collector tabs 11/positive electrode current collector lead 14 and the negative electrode current collector tabs 12/negative electrode current collector lead 15. Then, the positive electrode current collector tabs 11/positive electrode current collector lead 14 and the negative electrode current collector tabs 12/negative electrode current collector lead 15 were thermally melt-bonded and sealed to the two sealing members 16a and 16b, using an adhesive that effects melt-bonding by heat. In this step, the sealing members 16a and 16b were melt-bonded to the upper edge of the battery case 13 and to the current collectors of the stacked electrode assembly 10 more firmly than the sealing members 16a and 16b were melt-bonded to each other. Next, as illustrated in FIG. 9, two prismatic securing members 17a and 17b made of plastic (polypropylene) were placed from both sides of the sealing members 16a and 16b and were secured along the upper edge of the battery case 13. Each of the prismatic securing members 17a and 17b has a length that is equal to the width L11 of the battery case 13, a thickness that is about ½ of the thickness T11 of the battery case 13, and a height that is about equal to the just-mentioned thickness. Thereafter, as illustrated in FIG. 10, the battery case 13 was covered from both the front and rear sides by outer covers 18a, 18b made of two substantially rectangular-shaped aluminum laminate sheets each having a substantially similar shape to the planar shape of the battery case 13 to which the sealing members 16a and 16b were secured and each having slightly larger dimensions than the dimensions of the entire battery case 13. Then, the entire peripheral edge portions 19a and 19b of the outer covers 18a and 18b were thermally melt-bonded and sealed to each other. Thus, a battery as illustrated in FIG. 11 was fabricated, in which the entirety of the battery case 13, except for the fore-ends of the positive and negative electrode current collector leads 14 and 15 exposed outside, was air-tightly and liquid-tightly enclosed in the outer covers 18a and 18b. In this process, the portions of the outer covers 18a and 18b other than the portions thereof that are between the positive and negative electrode current collector leads 14 and 15 were melt-bonded to each other more firmly than the portions thereof that are between the positive and negative electrode current collector leads 14 and 15 were melt-bonded to each other, and also, the outer covers 18a and 18b and the positive and negative electrode current collector leads 14 and 15 were melt-bonded to each other more firmly than the portions thereof that are between the positive and negative electrode current collector leads 14 and 15 were melt-bonded to each other.

Preparation of Plastic Battery Case for Battery Module

Figure 12:
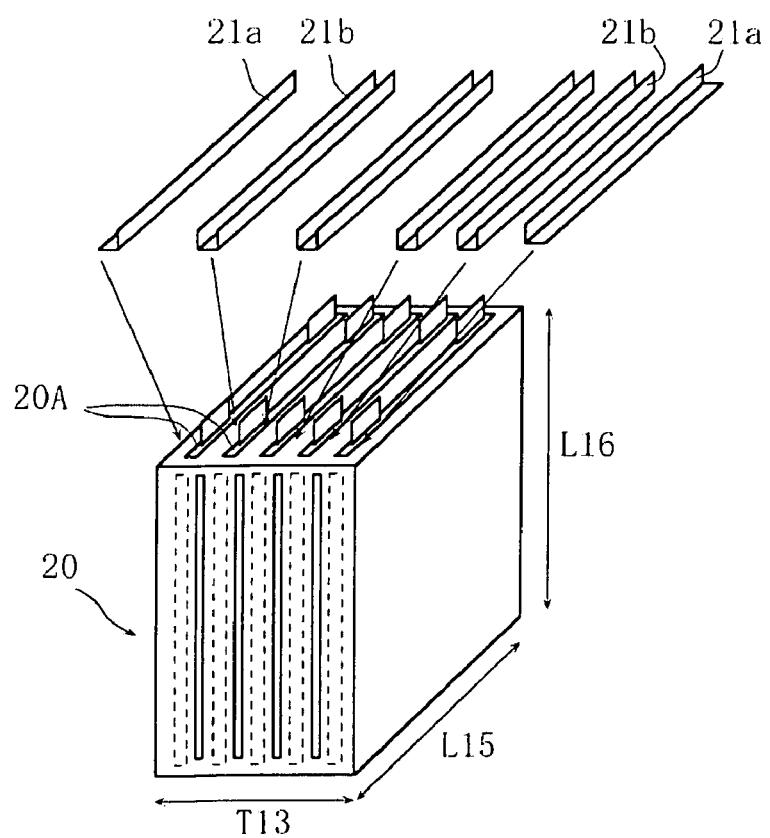
FIG. 12 is a perspective view illustrating a disassembled state of a battery module case and sealing members that constitute a battery module of the present invention.
Figure 13:
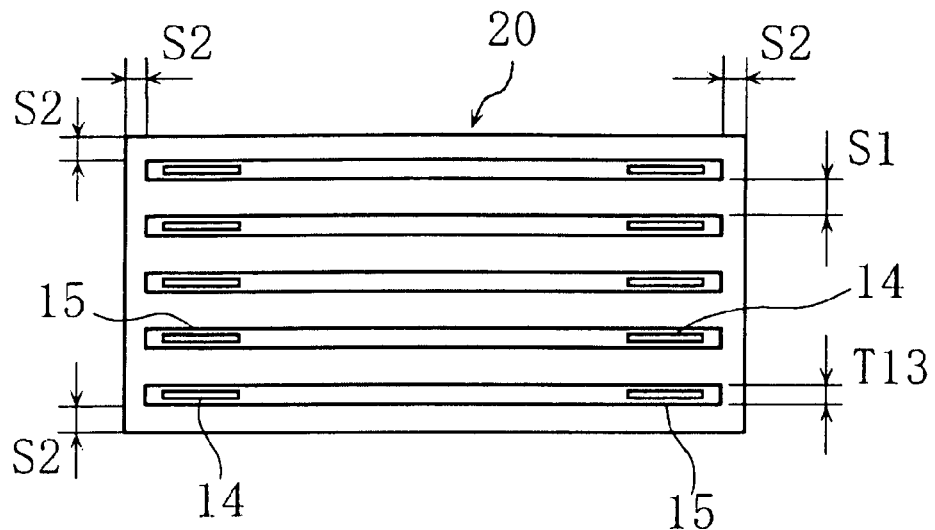
FIG. 13 is a plan view illustrating the battery module case shown in FIG. 12.
Figure 14:
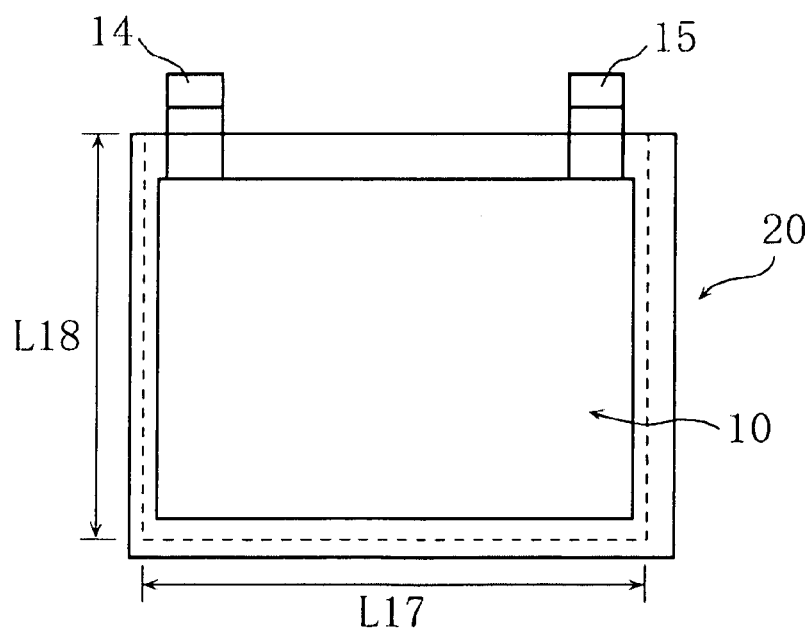
FIG. 14 is a front view illustrating the battery module case shown in FIG. 12.

As illustrated in FIGS. 12 through 14, a battery module case 20 made of polypropylene was prepared. The battery module case 20 has five rows of accommodating spaces disposed parallel to each other along the thickness direction and spaced at a gap S1=4 mm, each having a width L17=102 mm, a depth L18=105 mm, and a thickness T13=2.4 mm. As a result, in the top face of the battery module case 20, five rows of openings 20A are formed at a gap S2=2 mm from all the peripheral edges. The module 20 has a width L15=106 mm, a height L16=107 mm, and a thickness T13=32 mm.

Preparation of Battery Module

Figure 15:
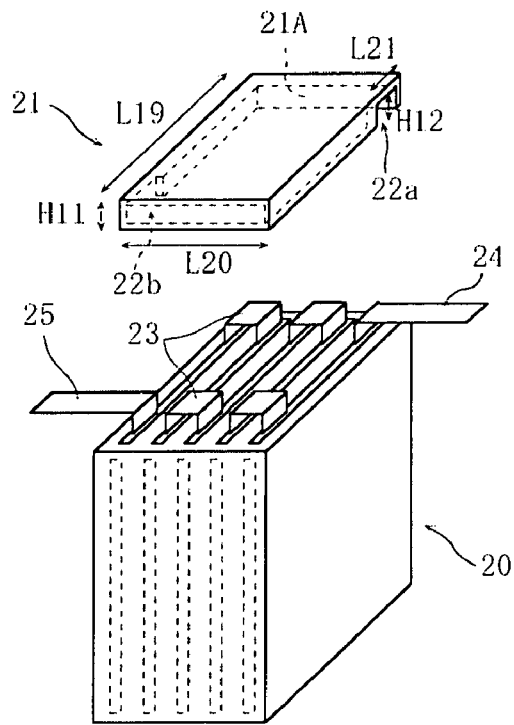
FIG. 15 is a perspective view illustrating a disassembled state of a battery module case and a securing member that constitute a battery module of the present invention.
Figure 16:
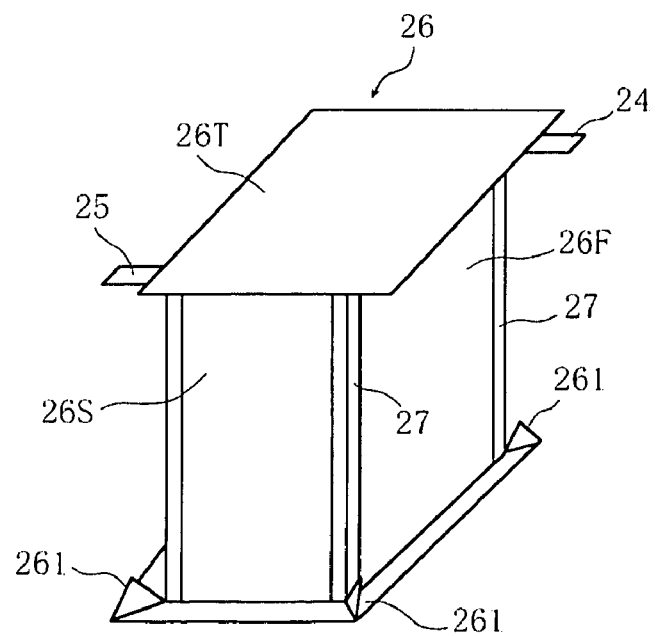
FIG. 16 is a perspective view illustrating a battery module of the present invention.
Figure 17:
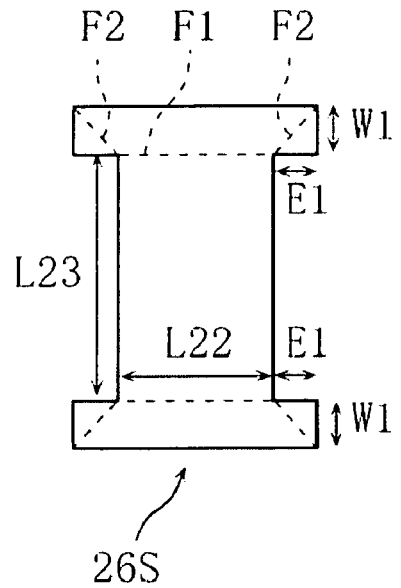
FIG. 17 is a front view illustrating a side face material that constitutes the outer cover used for a battery module of the present invention.
Figure 18:
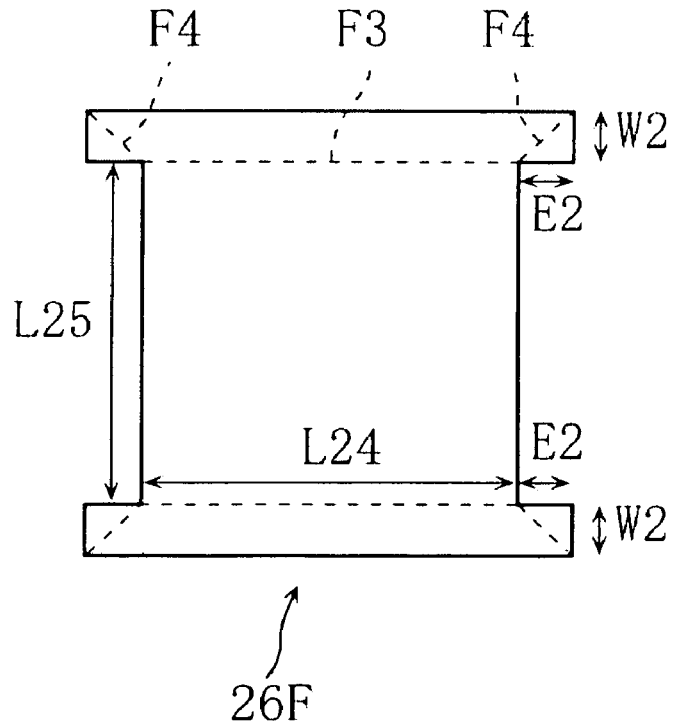
FIG. 18 is a front view illustrating a front/rear face material that constitutes the outer cover used for a battery module of the present invention.
Figure 19:
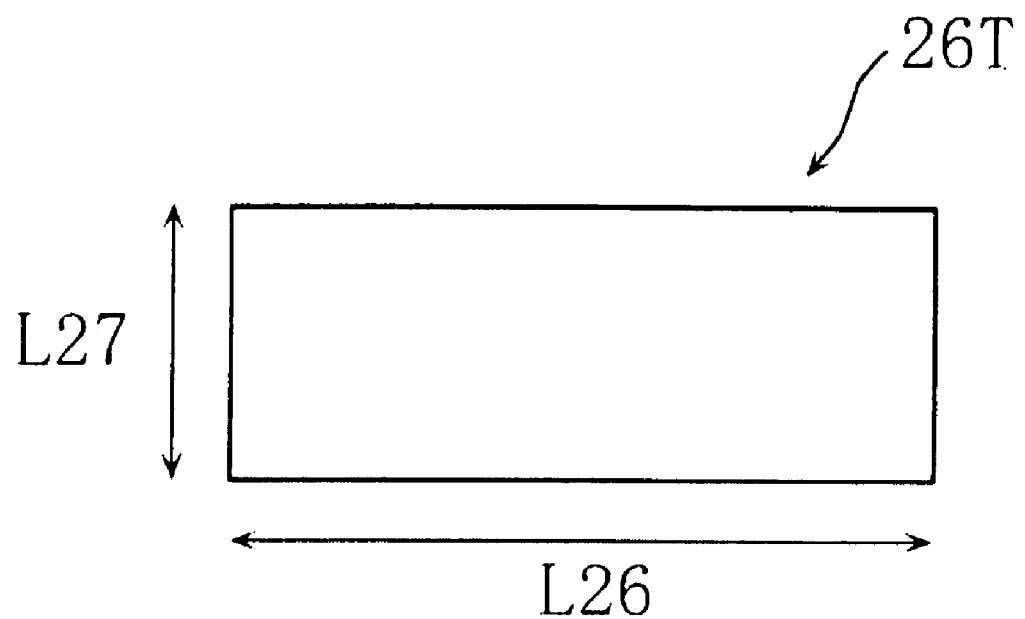
FIG. 19 is a front view illustrating a top/bottom face material that constitutes the outer cover used for a battery module of the present invention.

As illustrated in FIGS. 12 through 14, five stacked electrode assemblies 10 that were the same as that used in the above-described battery were prepared, and they were inserted from the openings 20A and disposed in the accommodating spaces of the battery module case 20 one by one. Next, a strip-shaped aluminum laminate sheet having a length of 106 mm and a width of 6 mm was bent perpendicularly at a position slightly shifted toward one side from the center of the width along a longitudinal direction. In this way, two end-part sealing members 21a formed in a hooked-shape cross section were prepared, each having a horizontal portion with a width of 2 mm and an upright portion with a height of 4 mm. In addition, a strip-shaped aluminum laminate sheet having a length of 106 mm and a width 12 mm was folded evenly into three at right angles along the longitudinal direction. In this manner, four intermediate-part sealing members 21b in a groove-like cross sectional shape were prepared, each having a horizontal portion with a width of 4 mm and upright portions with a height of 4 mm at both sides. In the battery module case 20, the horizontal portions of the end-part sealing members 21a were disposed along, and were thermally melt-bonded to, the front peripheral edge portion and the rear peripheral edge portion, each with a width of 2 mm, that were positioned at the front and rear outer edges of the openings 20A. In addition, the horizontal portions of the intermediate-part sealing members 21b were disposed and thermally bonded onto four 4-mm wide rows of locations on the container that are positioned between the five rows of the openings 20A. The regions of the upright portions of the end-part sealing members 21a and the intermediate-part sealing members 21b that are positioned between the respective two current collectors are thermally bonded and sealed to each other, so as to sandwich the positive electrode current collector tabs 11/positive electrode current collector lead 14 and the negative electrode current collector tabs 12/negative electrode current collector lead 15 of each of the stacked electrode assemblies 10 from both the front side and the rear side. In this process, the positive electrode current collector tabs 11/positive electrode current collector leads 14 and the negative electrode current collector tabs 12/negative electrode current collector leads 15 were not melt-bonded to the upright portions of the end-part and intermediate sealing members 21a and 21b. Thereafter, the same electrolyte solution as used for the battery was filled into the accommodating spaces of the battery module case 20 in the same manner as in the case of the battery. Then, the upright portions of the end-part and intermediate sealing members 21a and 21b were thermally melt-bonded and sealed to the positive electrode current collector tabs 11/positive electrode current collector leads 14 and the negative electrode current collector tabs 12/negative electrode current collector leads 15. In this process, the sealing members 21a, 21b were melt-bonded to the peripheral edges of the openings 20A of the battery module case 20 and to the current collectors of each of the stacked electrode assemblies 10 more firmly than the sealing members 21a, 21b were melt-bonded to each other. Subsequently, as illustrated in FIG. 15, the positive electrode current collector leads 14 and the negative electrode current collector leads 15 of the five stacked electrode assemblies 10 were connected in series with plate-shaped copper wires 23 so that the positive electrodes and the negative electrodes are connected alternately. Then, plate-shaped current collector terminals 24 and 25 were connected respectively to the endmost one of the positive electrode current collector leads 14 and the endmost one of the negative electrode current collector lead 15, and the current collector terminals 24 and 25 were directed frontward and rearward horizontally so that they extend outward from the battery module case 20. Next, a securing member 21 was prepared as illustrated in the same figure. The securing member 21 has a rectangular top plate with substantially equal dimensions as the top face of the battery module case 20, front and rear faces extending vertically downwardly from the two longer sides (L19=102 mm) of the top plate, side faces extending vertically downwardly from the two shorter sides (L20=32 mm), the front and rear faces and the side faces having a height H11=11 mm. By the front and rear faces and the two side faces, an inner cavity 21A that opens downwardly is formed. Cut-out portions 22a and 22b with a width L21=14 mm and a height H12=9 mm are provided in the front and rear faces near respective one ends thereof. The securing member 21 thus prepared was fitted and secured so that the five sets of the positive electrode current collector leads 14 and the negative electrode current collector leads 15 were covered from the top and the current collector terminals 24 and 25 were passed through the cut-out portions 22a and 22b. In this process, the securing member 21 was melt-bonded to the top face of the battery module case 20 so that the portion thereof other than the cut-out portions 22a and 22b was hermetically sealed. Lastly, as illustrated in FIG. 16, the battery module case 20 was covered by the outer cover 26 made of an aluminum laminate sheet, and the peripheral edge portion of the outer cover 26 was thermally melt-bonded and sealed. Thus, a battery module was prepared, in which the entirety of the battery module case 20, except for the fore-ends of the current collector terminals 24 and 25 exposed outside, was enclosed air-tightly and liquid-tightly in the outer cover 26. The outer cover 26 comprises two side faces each comprising a side face material 26S shown in FIG. 17, front and rear faces each comprising a front/rear face material 26F shown in FIG. 18, and top and bottom faces each comprising a top/bottom face material 26T shown in FIG. 19. The side face material 26S has a body portion having a width L22=32 mm, which is equal to the thickness T13 of the battery module case 20, and a height L23=L16+H11 (107 mm+11 mm)=118 mm, which is equal to the total height of the battery module case 20 and the securing member 21. The side face material 26S further has strip-shaped first fold-over portions with a width W1=5 mm that are provided at the top and bottom of the body portion. Each of the first strip-shaped fold-over portions extends outward and sideward from the body portion by a width E1=5 mm. The front/rear face material 26F has a body portion having a width L24=106 mm, which is equal to the width L15 of the battery module case 20, and a height L25=L16+H11 (107 mm+11 mm)=118 mm, which is equal to the total height of the battery module case 20 and the securing member 21. The front/rear face material 26F further has strip-shaped first fold-over portions with a width W2=5 mm that are provided at the top and bottom of the body portion. Each of the first fold-over portions extends outward and sideward from the body portion by a width E2=5 mm. The top/bottom face material 26T is configured to be in a rectangular shape having a long side L26=116 mm and a short side L27=42 mm. The side face material 26S is folded inward (or outward) at the boundary lines F1 between the body portion and the first fold-over portions, and is folded inward (or outward) at the oblique lines F2 extending diagonally from both ends of the boundary line F1 toward the corners of the first fold-over portion to form triangular second fold-over portions. On the other hand, the front/rear face material 26F is likewise folded inward (or outward) at the boundary lines F3, and is folded inward (or outward) at the oblique lines F4, to form the second fold-over portions. Then, as illustrated in FIG. 16, the first fold-over portions of the side face material 26S and the front/rear face materials 26F are overlapped and thermally melt-bonded with the peripheral edge portions of the top/bottom face materials 26T, and the second fold-over portions of the side face materials 26S and the second fold-over portions of the front/rear face materials 26F are overlapped and thermally melt-bonded with each other (the portions indicated by reference numeral 261 in the figure). In this process, the upper ones of the first fold-over portions of the front/rear face materials 26F and the upper one of the top/bottom face materials 26T (i.e., top face material) are overlapped with each other so as to sandwich the two current collector terminals 24 and 25 therebetween, and the first fold-over portions are thermally melt-bonded to the top face material 26T, and in addition, the first fold-over portions and the top face material 26T are thermally melt-bonded to the two current collector terminals 24 and 25. It should be noted that, in this process, the constituent components of the outer cover 26 (i.e., the side face materials 26S, the front/rear face materials 26F, and the top/bottom face materials 26T) were melt-bonded to each other more firmly than the first fold-over portions were melt-bonded to the top face material 26T and to the current collector terminals 24 and 25. Further, the side edges of the body portions of the side face material 26S and the side edges of the body portions of the front/rear face materials 26F are joined and sealed to each other with an aluminum tape 27 with a width of 10 mm, and thus, the outer cover 26 shown in FIG. 16 is prepared.

EXAMPLES

Example 1

A battery fabricated in the same manner as described in the foregoing embodiment was used as the battery of Example 1.

The battery thus fabricated is hereinafter referred to as a battery A1.

[Charge-discharge Test for the Battery]

The battery was charged at a constant current of 1.0 It (2.5 A) to 4.2 V, and thereafter discharged at a constant current of 1.0 It (2.5 A) to 2.5 V.

In the charge-discharge test, the average discharge voltage was 3.7 V, and the discharge capacity was 2.5 Ah.

Effects of the Battery

In the battery A1, a power-generating element containing the stacked electrode assembly 10 and the electrolyte solution is disposed in the accommodating space of the battery case 13 made of polypropylene resin. The positive electrode current collector tabs 11/positive electrode current collector lead 14 and the negative electrode current collector tabs 12/negative electrode current collector lead 15 connected to the positive electrode 1 and the negative electrode 2 of the power-generating element, i.e., the current collectors, are spaced apart and extend outward from the opening 13A of the battery case 13. The outer covers 18a, 18b made of an aluminum laminate sheet having a plurality of layers including a metal layer air-tightly and liquid-tightly enclose the entirety of the battery case 13 in which the power-generating element is disposed. The sealing members 16a and 16b are disposed and melt-bonded so as to cover the opening 13A of the battery case 13 and to sandwich the current collectors from both sides, whereby the opening 13A of the battery case 13 is sealed. The sealing members 16a and 16b are melt-bonded to the peripheral edge of the battery case 13 and to the current collectors 11/14 and 12/15 more firmly than the sealing members 16a and 16b are melt-bonded to each other. The outer covers 18a, 18b are sealed at at least a location corresponding to the opening 13A, in other words, at the entire peripheral edge, of the battery case 13.

In the configuration of the above-described battery A1, the battery case 13 is enclosed air-tightly and liquid-tightly in the outer covers 18a, 18b made of an aluminum laminate. Thereby, the required rigidity is ensured, and moreover, sufficient hermeticity is achieved without substantially impairing the lightness in weight of the battery case 13. In addition, the sealing members 16a and 16b are disposed and melt-bonded so as to cover the opening 13A of the battery case 13 and to sandwich the current collectors of the power-generating element disposed in the accommodating space of the battery case 13 from both sides, whereby the opening 13A of the battery case 13 is sealed. Therefore, if the internal pressure of the battery A1 rises to a certain level, the sealing portion at which the sealing members 16a and 16b are melt-bonded to each other is split open, and the gas is released outside. The sealing members 16a and 16b are configured to be melt-bonded and sealed also to the current collectors and the peripheral edge of the opening 13A of the battery case 13. However, the sealing members 16a and 16b are more firmly melt-bonded to these components than the sealing members are melt-bonded to each other. Accordingly, when the internal pressure of the battery A1 rises, only the sealed portion at which the sealing members 16a and 16b are melt-bonded to each other splits open, causing the gas to be released while the portions at which the sealing members 16a and 16b are melt-bonded to the current collectors and to the peripheral edge of the opening 13A of the battery case 13 do not split open but remain sealed. Thus, the sealed portion where the sealing members 16a and 16b are bonded to each other functions as a safety valve, and serves as a gas release passage that can guide the gas in the battery A1 to the outside. In addition, when the sealing portion at which the sealing members 16a and 16b are melt-bonded to each other is split open and the gas is released outside, the sealing of the outer covers 18a and 18b at the location corresponding to the opening 13A of the battery case 13 breaks successively, allowing the gas to be released outside. The outer covers 18a, 18b and the current collectors 14, 15 are melt-bonded to each other more firmly than the outer covers 18a, 18b are melt-bonded to each other in the location corresponding to the opening 13A of the battery case 13 (specifically, the location between the current collectors 14 and 15). Therefore, when the internal pressure of the battery A1 rises, the sealing portion of the outer covers 18a, 18b with each other splits open only at the location corresponding to the opening 13A of the battery case 13, causing the gas to be released. In other words, as in the case of the sealing of the sealing members 16a and 16b with each other, a gas discharge mechanism equivalent to a safety valve is constructed by a simple mechanism in which the sealing of the outer covers 18a and 18b breaks.

Moreover, since the securing members 17a and 17b having rigidity are disposed and secured so as to cover the opening 13A of the battery case 13 and to sandwich the current collectors from both sides, the required strength is ensured in the region above the top end face where the opening 13A of the battery case 13 is formed, especially in the sealing portions effected by the sealing members 16a and 16b, and a structure that can withstand impact from the outside is obtained.

Furthermore, since the securing members 17a and 17b are made of polypropylene resin, they are allowed to have substantially the same level of rigidity as the battery case 13, to be light in weight as the battery case 13 while functioning to supplement the strength in the region above the battery case 13, and also to be low cost components.

Still further, the sealing members 16a and 16b are separate components from the outer covers 18a and 18b and are made of an aluminum laminate sheet formed in a strip shape. Therefore, the sealing members 16a and 16b are allowed to have a shape corresponding to the shape of the region that requires sealing in the opening 13A of the battery case 13. As a result, the region can be sealed more reliably and easily, and reliability and workability are improved correspondingly.

Example 2

A battery module fabricated in the same manner as described in the foregoing embodiment was used as the battery module of Example 2.

The battery module thus fabricated is hereinafter referred to as a battery module B1.

[Charge-discharge Test for the Battery Module]

The battery was charged at a constant current of 1.0 It (2.5 A) to 21 V and thereafter discharged at a constant current of 1.0 It (2.5 A) to 12.5 V.

In the charge-discharge test, the average discharge voltage was 18.5 V, and the discharge capacity was 2.5 Ah.

Effects of the Battery Module

The configuration of the battery module B1 is as follows. The battery module case 20 has five accommodating spaces formed therein, and each one of the power-generating elements, which comprises the stacked electrode assembly 10 and the electrolyte solution, is disposed in a respective one of the accommodating spaces. The positive electrode current collector tabs 11/positive electrode current collector leads 14 and the negative electrode current collector tabs 12/negative electrode current collector leads 15, i.e., the current collectors, respectively connected to the positive electrode 1 and the negative electrode 2 of each of the power-generating element are spaced apart and extend outward from the five rows of the openings 20A formed in the battery module case 20. The outer cover 26 made of an aluminum laminate sheet having a plurality of layers including a metal layer air-tightly and liquid-tightly encloses the entirety of the battery module case 20 in which the power-generating elements are disposed. The sealing members 21a and 21b are disposed and melt-bonded so as to cover the openings 20A of the battery module case 20 and to sandwich the current collectors of the power-generating elements from both sides, whereby the openings 20A of the battery module case 20 are sealed. The sealing members 21a and 21b are melt-bonded to the peripheral edges of the openings 20A of the battery module case 20 and to the current collectors 11/14 and 12/15 of the power-generating elements 10 more firmly than the sealing members 21a and 21b are melt-bonded to each other. The current collectors of the power-generating elements are connected to each other either in series or in parallel and are connected to the positive and negative electrode current collector terminals 24 and 25, and the positive and negative electrode current collector terminals 24 and 25 extend outward from the outer cover. The first fold-over portions of the front/rear face materials 26F and the peripheral edge portions of the top face material 26T of the outer cover 26 are sealed at at least the portions from which the positive and negative electrode current collector terminals 24 and 25 extend outside.

In the above-described battery module B1, the battery module case 20 is enclosed air-tightly and liquid-tightly in the outer cover 26 made of an aluminum laminate, as in the case of the above-described battery A1. As a result, the required rigidity is ensured, and moreover, sufficient hermeticity is achieved without substantially impairing the lightness in weight of the battery module case 20. In addition, the sealing members 21a and 21b are disposed and melt-bonded so as to cover the openings 20A of the battery module case 20 and to sandwich the current collectors of each of the power-generating elements, disposed in the accommodating spaces of the battery module case 20, from both sides, whereby the openings 20A of the battery module case 20 are sealed. As a result, the sealing portions at which the sealing members 21a and 21b are melt-bonded to each other function as safety valves and also serve as gas release passages through which the gas inside the batteries constituting the battery module B1 can be released outside. In other words, without additionally providing a safety valve, a gas release mechanism in the event of internal pressure increase is constructed by making use of the sealing portions in the openings 20A of the battery module case 20. Accordingly, the parts count of the battery module B1 is reduced, and thereby the battery module B1 is made lighter in weight and lower in cost.

Moreover, the outer cover 26 is sealed at the portions from which the positive and the negative electrode current collector terminals 24 and 25 extend outside the outer cover. Thereby, a portion of the gas release passage can be formed making use of portions from which the positive and the negative electrode current collector terminals 24 and 25 extend outside, and the sealing of the outer cover 26 can be broken at this portion to release the gas to the outside. Thus, a gas release passage that can smoothly release the gas can be formed at these portions with a simple and efficient configuration.

Specifically, in the battery module B1, when the battery internal pressure has increased in one of the five cells in the battery module B1, the sealing of the sealing members 21a/21b with each other in the cell breaks first, and the gas in the cell is released outside through an opening 20A of the battery module case 20. Subsequently, the sealing of the outer cover 26 in a portion from which the positive and negative electrode current collector terminals 24 and 25 extend outward (i.e., the sealing of the upper one of the first fold-over portions of the front/rear face material 26F the top face material 26T with the current collector terminals 24 and 25, effected by melt-bonding) breaks, allowing the gas to be released outside. At this time, the gas released from the opening 20A passes through the cut-out portions 22a and 22b of the securing member 21 and is guided so as to be released outside along the directions in which the positive and negative electrode current collector terminals 24 and 25 extend outside. Specifically; gas discharge passages are formed from the openings 20A through the cut-out portions 22a and 22b of the securing member 21 to outside the outer cover 26 so that the gas can be guided and released smoothly. Here, the portions from which the positive and negative electrode current collector terminals 24 and 25 extend outside are made to function as the gas discharge passages, so the structure is simplified in comparison with the case in which the portions from which positive and negative electrode current collector terminals 24 and 25 extend outside and gas discharge passages are formed separately at different locations. In addition, the structure is capable of releasing the gas efficiently making use of the portions from which the positive and negative electrode current collector terminals 24 and 25 extend outside. In addition, the sealing of the sealing members 21a/21b with each other and the sealing of the outer cover 26 constitute a gas discharge mechanism that can effectively serve the function equivalent to a safety valve with a simple configuration, as in the case of the battery A1. Furthermore, in the case of the battery module B1, the sealing of the sealing member 21a/21b with each other in one of the cells breaks first when the battery internal pressure rises, and subsequently, the sealing of the outer cover 26 breaks, to release the gas outside. Therefore, the cell that has undergone the abnormality does not adversely affect the rest of the cells.

Furthermore, five accommodating spaces are formed in the battery module case 20, and one of the power-generating elements, each comprising the positive electrode 1, the negative electrode 1, and an electrolyte, is disposed in a respective one of the accommodating spaces. Thus, the battery module B1 is configured without separately preparing and using housings made of metal or plastic, or components for a battery module. As a result, the parts count of the battery module B1 is further reduced, and the battery module B1 is further made lighter in weight and lower in cost.

In addition, the securing member 21 having rigidity is disposed and secured so as to cover the openings 20A of the battery module case 20. Thereby, sufficient strength is ensured at the portions in the openings 20A of the battery module case 20 from which the current collectors of each of the power-generating elements extend, and a structure that can withstand impact from outside is achieved, as in the case of the battery A1.

Further, the securing member 21 has a shape such as to cover the entirety of the current collectors connected in series or in parallel, and comprises cut-out portions 22a and 22b through which the positive electrode current collector terminal and the negative electrode current collector terminal are allowed to pass, whereby the securing member 21 can be disposed more easily and reliably. Specifically, since the entirety of the current collectors 14 and 15 can be covered by one securing member 21, the securing member 21 can be configured more easily, and moreover the work of positioning and securing the securing member 21 can be conducted more easily and reliably, than in the case in which each one of the openings 20A of the battery module case 20 is provided with one corresponding securing member.

In addition, by positioning and securing the securing member 21 so that the portion other than the cut-out portions 22a and 22b is hermetically sealed, the gas can be guided to the cut-out portions, in other words, to the portions from which the positive and the negative electrode current collector terminals 24 and 25 extend outside, more smoothly and reliably.

Moreover, since the securing member 21 is made of polypropylene resin, the securing member 21 has a sufficient rigidity, is lightweight while functioning to supplement the strength in the region above the battery module case 20, and moreover is a low cost component.

Still further, the sealing members 21a and 21b are made of an aluminum laminate sheet formed in a strip shape. Therefore, as in the case of the battery A1, the sealing members 21a and 21b have a shape corresponding to the shape of the region that requires sealing in each of the openings 20A of the battery module case 20. As a result, the region can be sealed more reliably and easily, and reliability and workability are improved correspondingly.

OTHER EMBODIMENTS (1) Other than the one comprising a plurality of layers including a metal layer, such as the above-described aluminum laminate sheet, the outer cover may be made of one made of a single metal layer, such as an aluminum foil or a copper foil. In this case, the outer cover and the current collectors are insulated from each other by adhesive for thermally bonding them. The melt-bonding of the outer covers to each other should be controlled so that the region between the current collectors is melt-bonded more firmly than the rest of the region is melt-bonded. This allows the sealing portion of the outer covers that is between the current collectors to function as a safety valve.

(2) In the case of a battery, it is possible to employ a configuration in which, for example, a portion of the outer cover also serves as a sealing member other than using the sealing members as described above; in other words, the sealing members are part of the outer cover. When the outer cover is made of, for example, a laminate or a metal foil that is sufficiently flexible, it is possible to dispose the outer cover so as to cover the opening portion of the battery case and also to sandwich the current collectors from both sides, so that the peripheral edge of the opening portion of the battery case and the current collectors may be melt-bonded and sealed by the outer cover and also the portions of the outer cover that are between the two current collectors may be melt-bonded and sealed to each other. In this way, the outer cover itself is allowed to function equally to the sealing members. Thereby, the parts count is further reduced, accordingly the battery construction is simplified, and the cost is further reduced.

(3) Other than the one in which a plurality of accommodating spaces are formed as described above, the battery case for the battery module may be constituted by a plurality of battery cases coupled to each other, each having one or more accommodating spaces formed therein. In this case, it is desirable in terms of parts count that, for example, the plurality of battery cases be coupled directly to each other by such a method as welding and adhesive bonding because, in this way, no additional coupling member becomes necessary.

(4) The positive electrode active material is not limited to lithium cobalt oxide. Other usable materials include lithium composite oxides containing cobalt, nickel, or manganese, such as lithium cobalt-nickel-manganese composite oxides, lithium aluminum-nickel-manganese composite oxides, and lithium aluminum-nickel-cobalt composite oxides, as well as spinel-type lithium manganese oxides.

(5) Other than graphite such as natural graphite and artificial graphite, various materials may be employed as the negative electrode active material, as long as the material is capable of intercalating and deintercalating lithium ions. Examples include coke, tin oxides, metallic lithium, silicon, and mixtures thereof.

(6) The electrolyte is not limited to that shown in the examples above, and various other substances may be used. Examples of the lithium salt include $LiBF_4$, $LiPF_6$, $LiN(SO_2CF_3)_2$, $LiN(SO_2C_2F_5)_2$, and $LiPF_{6-x}(C_nF_{2n+1})_x$ (wherein $1<x<6$ and $n=1$ or $2$), which may be used either alone or in combination. The concentration of the supporting salt is not particularly limited, but it is preferable that the concentration be restricted in the range of from 0.8 moles to 1.8 moles per 1 liter of the electrolyte. The types of the solvents are not particularly limited to EC and MEC mentioned above, and examples of the preferable solvents include carbonate solvents such as propylene carbonate (PC), γ-butyrolactone (GBL), ethyl methyl carbonate (EMC), dimethyl carbonate (DMC), and diethyl carbonate (DEC). More preferable is a combination of a cyclic carbonate and a chain carbonate.

The present invention is suitably applied to, for example, low-rate discharge backup power sources for computers, which are used in the event of power failure.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2007-143845 filed May 30, 2007, which is incorporated herein by reference.

What is claimed is:

1. A battery comprising:
a battery case made of rigid plastic and having an accommodating space;
a power-generating element disposed in the accommodating space of the battery case, the power-generating element comprising a positive electrode, a negative electrode, and an electrolyte;
current collectors respectively connected to the positive electrode and the negative electrode of the power-generating element, the current collectors disposed spaced apart and extending outward from an opening portion of the battery case;
an outer cover air-tightly and liquid-tightly enclosing an entirety of the battery case in which the power-generating element is disposed, the outer cover being a laminate of a flexible material including a metal layer; and
sealing members disposed and melt-bonded so as to cover the opening portion of the battery case and sandwich the current collectors from both sides, whereby the opening portion of the battery case is sealed; and wherein
the sealing members are melt-bonded to the peripheral edge of the opening portion of the battery case and to the current collectors more firmly than the sealing members are melt-bonded to each other, and the outer cover is sealed at at least a location corresponding to the opening portion of the battery case.

2. A battery according to claim 1, wherein the sealing members are part of the outer cover.

3. A battery according to claim 1, wherein a securing member having rigidity is secured so as to cover the opening portion of the battery case and sandwich the current collectors from both sides.

4. A battery according to claim 3, wherein the securing member is made of plastic.

5. A battery according to claim 1, wherein the sealing members are separate components from the outer cover and made of a film material formed in a strip shape, the film material having one or more layers including a metal layer.

6. A battery according to claim 1, wherein the battery is a lithium-ion battery.

7. A battery module comprising:

a battery case made of rigid plastic and having a plurality of accommodating spaces;

a plurality of power-generating elements disposed in the accommodating spaces of the battery case, each one of the power-generating elements comprising a positive electrode, a negative electrode, and an electrolyte and disposed in a respective one of the plurality of accommodating spaces;

current collectors respectively connected to the positive electrode and the negative electrode of each of the power-generating elements, the current collectors disposed spaced apart and extending outward from a plurality of opening portions formed in the battery case;

an outer cover air-tightly and liquid-tightly enclosing an entirety of the battery case in which the power-generating elements are disposed, the outer cover being a laminate of a flexible material including a metal layer; and sealing members disposed and melt-bonded so as to cover the opening portions of the battery case and sandwich the current collectors of the power generating elements from both sides, whereby the opening portions of the battery case are sealed; and wherein the sealing members are melt-bonded to peripheral edges of the opening portions of the battery case and to the respective current collectors of the power-generating elements more firmly than the sealing members are melt-bonded to each other;

the current collectors of the power-generating elements are connected to each other either in series or in parallel and are connected to a positive electrode current collector terminal or a negative electrode current collector terminal, the positive and negative electrode current collector terminals extending outward from the outer cover; and the outer cover is sealed at at least the portions from which the positive and negative electrode current collector terminals extend outward.

8. A battery module according to claim 7, wherein a securing member having rigidity is disposed and secured so as to cover the opening portions of the battery case.

9. A battery module according to claim 8, wherein the securing member has a shape such as to cover an entirety of the current collectors connected in series or in parallel, and comprises a cut-out portion allowing the positive electrode current collector terminal or the negative electrode current collector terminal to pass therethrough.

10. A battery module according to claim 8, wherein the securing member is made of plastic.

11. A battery module according to claim 7, wherein the sealing members are made of a film material formed in a strip shape, the film material having one or more layers including a metal layer.

12. A battery module according to claim 7, wherein the battery module comprises a lithium-ion battery.

* * * * *